9776X
T. Shaw,
Cook Stove.
Patented June. 25. 1836
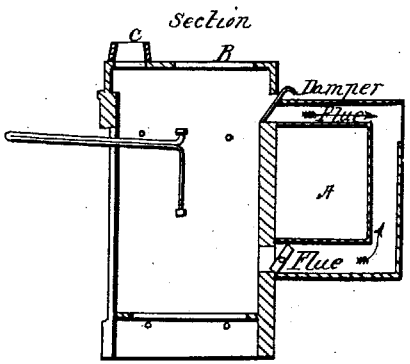
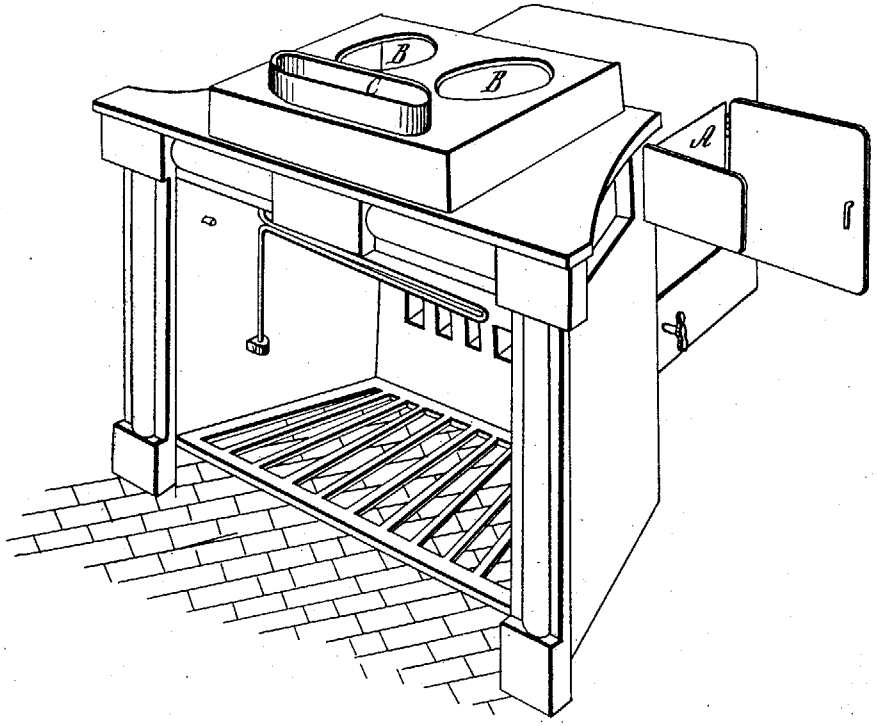

Pat.d June 25. 1836 25

Thomas Shaw: of N. Yarmouth - Maine 9776X
Letters Patent

The schedule referred to in these Letters Patent, and making part of the same, containing a description in the words of the said Thomas Shaw, himself, of his improvement in the Cooking Stove: -

---

To all to whom these presents shall come: Be it known that I Thomas Shaw of North Yarmouth, in the County of Cumberland and State of Maine joiner, have invented a new and useful open Cooking Stove, and the following is a full and exact description of the construction and operation of said Cooking Stove as invented by me. It consists of an oven and two boilers made either of sheet or cast iron, constructed over a fire frame - the oven in front and the boilers in the back part of the Stove behind the funnel -
The heat for using it is produced either by wood or coal, which is placed in an iron grate made to slide into the top of the fire frame, and under the oven and boilers - At the same time the fire is placed in the grate a fire may be had in the lower part of the fire frame, as a space is left behind the grate for a flue - There is a damper placed in the back part of the Stove which by being pushed back admits the heat both from the fire place and the grate into the Stove and by being drawn forward excludes the heat from both, throwing it back into the chimney - the jams of the fire place may be either of iron or brick - The fuel is placed in the grate by a door in the side of the frame. When the damper above mentioned is pushed back the heat or flame passes up under the boilers and over the oven. The funnel passes up from the front part of the Stove -
The petitioner claims only the exclusive right of the grate which slides into the top of the fire frame, and of the Cooking Stove constructed over it - Witness my hand this fourth day of March in the year of our Lord, eighteen hundred and thirty-six -

— Witnesses
Wm. I. Smith
George Chase

Thomas Shaw

Exd
[illegible]

[illegible]

(Patented 25 June 1836)

Drawing